United States Patent [19]

McVicker

[11] Patent Number: 4,937,427
[45] Date of Patent: Jun. 26, 1990

[54] APPARATUS AND METHOD FOR AUTOMATICALLY WELDING A T-JUNCTION CONNECTOR TO A MAIN PIPE

[76] Inventor: Noel McVicker, 10 Malvern Cres., Guelph, Ontario, Canada, N1H 6H8

[21] Appl. No.: 328,132

[22] Filed: Mar. 23, 1989

[51] Int. Cl.$^5$ .............................................. B23K 9/12
[52] U.S. Cl. .............................. 219/125.11; 219/60 R; 219/61
[58] Field of Search ...................... 219/60 R, 60 A, 61, 219/125.11, 125.1

[56] References Cited

U.S. PATENT DOCUMENTS

| 3,215,812 | 11/1965 | Smith | 219/125.11 |
| 4,144,992 | 3/1979 | Omae et al. | |
| 4,373,125 | 2/1983 | Kazlauskas. | |
| 4,659,903 | 4/1987 | Berne et al. | |

FOREIGN PATENT DOCUMENTS 55-1973   1/1980   Japan ............................. 219/125.11

Primary Examiner—Clifford C. Shaw
Attorney, Agent, or Firm—Bailey & Hardaway

[57] ABSTRACT

An apparatus and a method for automatically welding a T-junction connector to a main pipe are disclosed. The apparatus includes a rotatable frame which is provided with a movable bracket for supporting a welding gun. The frame is preferably attached by a vertical shaft to a portable framework having a wheeled leg and a pair of spaced apart horizontal handles. The portable framework may be moved from one location to another on its wheeled leg. The frame is rotated about the shaft by a computer controlled motor. Two other motors mounted to the frame are interconnected with the bracket for supporting a welding gun or torch, and adapted to move the welding gun along axes parallel with and normal to a T-junction connector supported in a preformed hole in a main pipe.

6 Claims, 3 Drawing Sheets

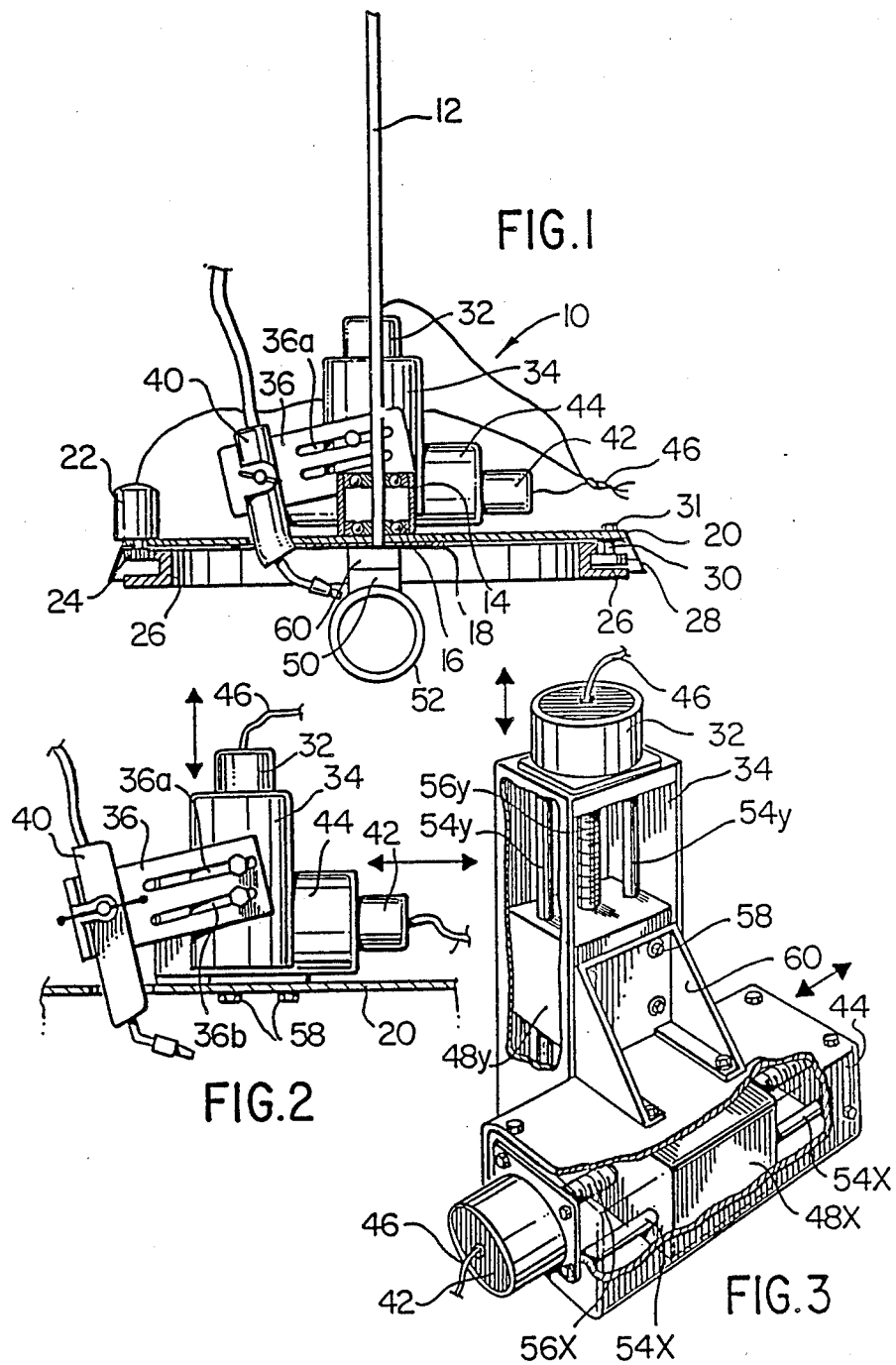

APPARATUS AND METHOD FOR AUTOMATICALLY WELDING A T-JUNCTION CONNECTOR TO A MAIN PIPE

The present invention relates to automated pipe welding equipment and, in particular, to an apparatus and method for automatically welding a T-junction connector to a main pipe.

BACKGROUND OF THE INVENTION

Automated apparatus for welding butt joints between two similarly sized pipes is well known. An apparatus for welding a branch pipe to a main pipe is also known and described in U.S. Pat. No. 4,659,903. This patent teaches a computer controlled welding unit, supported by a gantry crane, and a main pipe positioning machine having opposing servomotor powered cones which lift, support and position a main pipe during the welding operation so that the surface being welded is always relatively level. This apparatus is principally suitable for the automated welding of branch pipe joints required in the construction of pipelines, offshore drilling rig platform structures, bridge supports, and similar large tubular structures.

Modern construction often requires the installation of networks of metal piping, especially for the fire protection systems of building. Building codes generally specify that steel piping be used in the installation of fire sprinkler systems. Fire sprinkler systems usually include one or more header pipes having smaller subheader and/or distribution pipes radially connected at intervals for distributing fire extinguishing fluid throughout the interior of a building. At each point where a branch pipe is required, the headers and/or subheaders must be cut to accommodate a cast iron branch pipe connector in the pipe run, or provided with machined T-junction connectors which are welded in preformed radial holes in the headers and/or subheaders to provide threaded connectors for each branch. Welding machined T-junction connectors to main pipes is cheaper and more efficient than cutting main pipes into sections, threading each end of each section and connecting an expensive cast iron fitting for each branch. There is a disadvantage to using welded T-junctions, however. Traditionally, the welding is done by skilled professional welders. Construction schedules may therefore depend on the availability of experienced welders, and professional welders contribute significantly to the cost of fire sprinkler system installations. There therefore exists a need for a portable automated apparatus for welding T-junction connectors to main pipes and, in particular, for one which may operated by persons without welding experience.

It is an object of the invention to provide a light weight and easily portable apparatus for automatically welding T-junction connectors to a main pipe.

It is a further object of the invention to provide an apparatus for automatically welding T-junction connectors to a main pipe which can be operated by a person with no welding training or experience.

It is yet a further object of the invention to provide an apparatus for automatically welding T-junction connectors to a main pipe which is relatively simple to construct and inexpensive to manufacture.

SUMMARY OF THE INVENTION

The present invention provides a computer controlled, automated apparatus for welding T-junction connectors to a main pipe. A preferred embodiment of an apparatus in accordance with the invention is completely portable and may be readily transported from one job site to another. Furthermore, no special pipe handling equipment is required for welding efficiently with the preferred embodiment of the invention. A main pipe may be supported on practically any raised surface that is relatively horizontal. Pipe stands are excellent supports, and even narrow benches or sawhorses may be used.

The preferred embodiment of the invention includes a rotatable frame which is provided with a movable bracket for supporting a welding gun. The frame is preferably attached by a vertical shaft to a portable framework having a wheeled leg and a pair of spaced apart horizontal handles. The portable framework may be moved from one location to another on its wheeled leg. The frame is rotated about the shaft by a computer controlled motor. Two additional motors which are mounted to the frame are interconnected with the bracket for supporting a welding gun or torch. Those two motors are also computer controlled and adapted to move the welding gun along axes parallel with and normal to a T-junction connector supported in a preformed hole in a main pipe.

In more general terms a preferred embodiment of the present invention includes an apparatus for automatically welding a T-junction connector to a main pipe, said apparatus comprising:

means for supporting said T-junction connector in a preformed hole in said main pipe;

welding means mounted on a frame rotatable above said T-junction connector, said welding means being movable along axes parallel with and perpendicular to said T-junction connection;

means for rotating said frame and means for moving said welding means along said respective axes; and a computer for receiving data defining the diameters of said main pipe and T-junction connector and transmitting signals for controllably rotating said frame and moving said welding means to effect a weld along said junction line.

BRIEF DESCRIPTION OF THE DRAWINGS

A preferred embodiment of the invention will now be explained by way of example only and with reference to the following drawings wherein:

FIG. 1 is a cross sectional view of a preferred embodiment of a welding apparatus in accordance with the invention showing the apparatus in position for beginning a welding operation;

FIG. 2 is a detail of the components of the apparatus shown in FIG. 1 for moving the welding gun along the X (horizontal) and Y (vertical) axes;

FIG. 3 is a cut-away detail of the components for moving the welding gun shown in FIG. 2;

DETAILED DESCRIPTION OF THE PREFERRED EMBODIMENT

Figure 4:
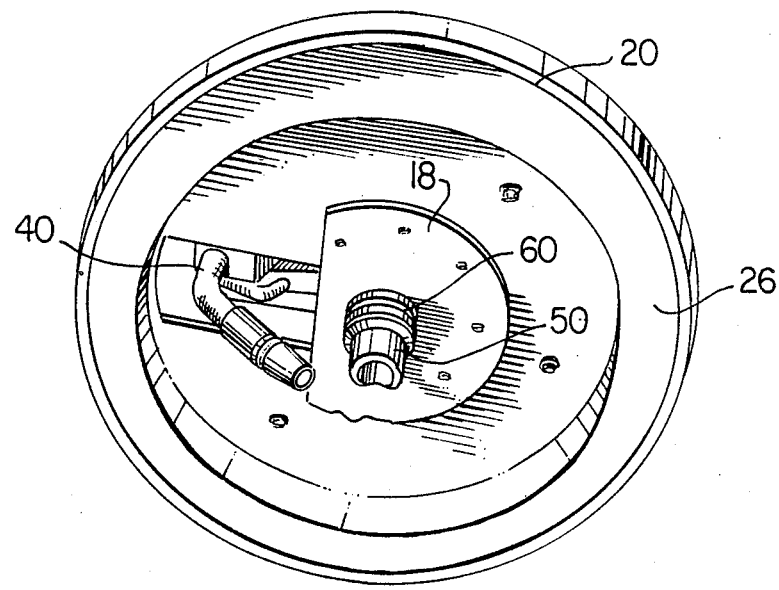
FIG. 4 is a perspective view of the underside of the welding apparatus shown in FIG. 1.

As illustrated in FIG. 1, a preferred embodiment of an apparatus for automatically welding a T-junction connector perpendicular to a header pipe is generally indicated by the reference 10. The apparatus includes an elongated shaft 12 which passes through a sleeve 14 provided with roller bearings 16 on each of its ends. The sleeve 14 is welded, or otherwise affixed, to a circular support plate 18 which is in turn secured with bolts or screw fasteners to a circular frame 20, shown in cross-section in FIG. 1. Frame 20, preferably spun or cast aluminum, is therefore rotatable about the shaft 12. The rotation of frame 20 about the shaft 12 is effected by a motor 22. The motor 22 turns a gear 24 which meshes with the complementary teeth of a ring gear 26, also shown in cross-section in FIG. 1. Ring gear 26 is supported from frame 20 by three or more bearings 28, only one of which is illustrated. The bearings 28 are attached to the frame 20 by spacers 30 and bolts 31. Ring gear 26 is therefore rotatable in relation to frame 20, and vice versa, when the motor 22 is energized. In order to ensure the accuracy of the movement of a welding gun 40 about shaft 12, hereinafter referred to as the Z axis, ring gear 26 must be secured in a fixed position. There are several methods of accomplishing this, as will be explained in more detail hereinafter.

Two additional motors 32 and 42 control the movement of a welding gun 40 along the X (horizon(al) and Y (vertical) axes. The motor 32 is connected to one end of a rigid rectangular housing 34 which is described below. The motor 42 is likewise attached to a similar housing 44. A bracket 36 for supporting the welding gun 40 is attached on its one end to rectangular housing 34 by a pair of bolts. The bracket 36 is provided with slots 36a and 36b to permit the adjustment of the tilt and length of the bracket to accommodate different styles of welding guns or torches. The welding gun 40 is preferably a MIG (metal in gas) welder well known in the art, however, other types of welding guns or torches may be adapted for use with the invention.

FIGS. 2 and 3 illustrate the preferred arrangement of motors 32 and 42 and the interconnection of the rectangular housings 34 and 44. As noted above, motors 32 and 42 are respectively connected to the end of the rigid rectangular housings 34 and 44. Each housing is connected on its two ends by elongated rods to drive blocks 48x and 48y respectively (FIG. 3). The drive blocks are provided with both transverse and longitudinal bores. A smooth bore approximate the lower edge of each longitudinal side of each block 48x and 48y slidably accommodates a guide rod 54x and 54y (see FIG. 3). A third longitudinal, threaded bore in the center of each drive block 48x and 48y accommodates a threaded screw, 56x and 56y respectively, which is journaled in a bearing on one end of each housing and connected to the respective drive shafts of each motor. The drive also provided with transverse bores to accommodate bolts 58 and 58. The bolts 58 (not illustrated) secure the X-axis drive block to frame 20 and bolts 58y secure the Y-axis drive block to a triangular bracket 60 which is bolted to the top of the rigid housing 44. As will be apparent from FIGS. 2 and 3, the drive blocks 48x and 48y are fixed in their locations. When the X-axis motor 42 is energized it turns the threaded rod 56x which interacts with block 48x to move the housing 44 to the left or right as indicated by the arrows in FIGS. 2 and 3. The movement of housing 44 in turn moves housing 34, which is connected to it, along the horizontal X-axis. When motor 32 is energized, it likewise turns a threaded rod 56y that interacts with the fixed block 48y to move housing 34 in a vertical direction, along the Y axis. The bracket 36, adjustably attached to the housing 34, accommodates the welding gun 40. It will be appreciated that the combined action of motors 32 and 42 effect the coordinated movement of welding gun 40 along both the X and Y axes simultaneously.

FIG. 4 illustrates a perspective view of the underside of the apparatus shown in cross-section in FIG. 1. A T-junction connector 50 is attached to an adapter 60 which is in turn removably connected to shaft 12 (see FIG. 1). The adapter 60 is interchangeable to accommodate various diameters of T-junction connectors. An adapter 60 must therefore be provided for each diameter of T-junction connector to be welded.

Figure 5:
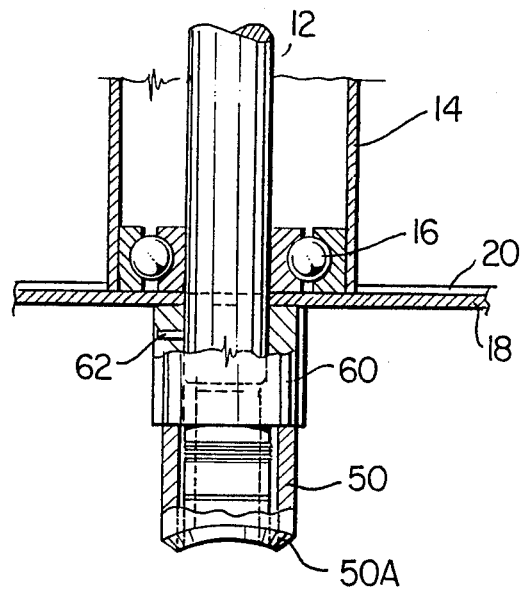
FIG. 5 is a cross-sectional detail of the lower end of the shaft shown in FIG. 1, with a typical T-junction connector attached to its end.

FIG. 5 shows a cross-sectional view of the lower end of shaft 12 and the construction of the adapter 60. Adapter 60 is removably attached to the end of shaft 12 by a set screw 62. The free end of adapter 60 is threaded to engage the threads of a T-junction connector 50. The T-junction connector 50 as shown attached to the end of adapter 60, is ready for a welding operation. It should be noted that the lower end 50A of T-junction connector 50 is machined to fit closely within the contour of a hole cut or burned in a main pipe. The machined contour on the free end of the T-junction connector 50 is required to minimize friction losses in the main pipe and meet building code standards for fire sprinkler systems. Such fittings and their manufacture are well known in the art.

Adapter 60 may alternatively be magnetized on its lower end and sized to fit slidably within the interior of the T-junction connector 50. A fitting 50 pushed over a magnetic adapter 60, is effectively held in place until the welding operation is complete, at which time the shaft is easily lifted out of the T-junction connector. The connection and disconnection of T-junction connectors to the end of a threaded adapter 60 will be explained hereinafter.

Figure 6:
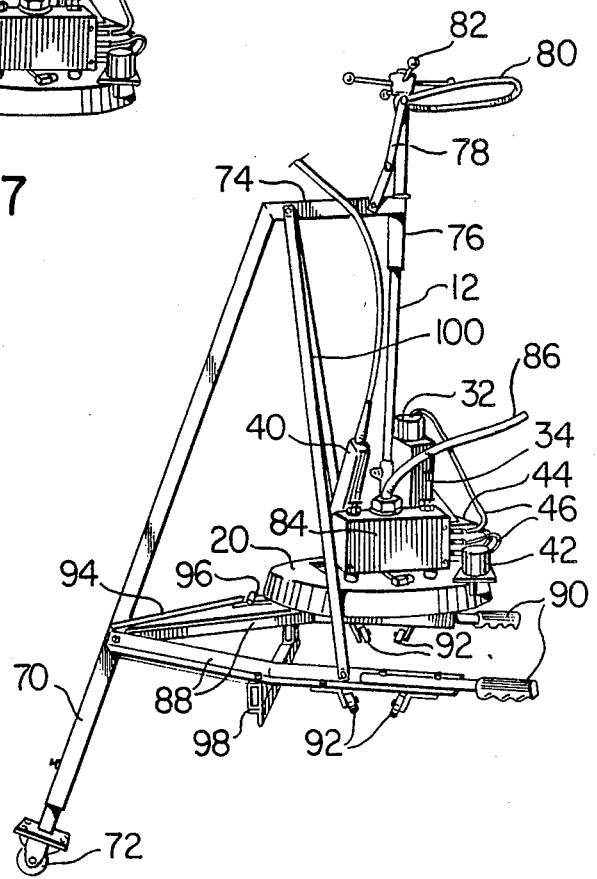
FIG. 6 is a perspective view of a preferred embodiment of a portable support structure for the welding apparatus illustrated in FIG. 1.

FIG. 6 illustrates a portable framework for the welding apparatus of FIG. 1. The portable framework includes a leg 70, adjustable in length, which is provided with a wheel 72 on its lower end and a horizontal section 74 on its upper end. The horizontal sec(ion 74 is welded to a vertical sleeve 76 which slidably accommodates the shaft 12. A flexible link 78 interconnects the top of shaft 12 with the horizontal section 74. The flexible link 78 limits the displacement of shaft 12 within sleeve 76 so that the apparatus is conveniently handled. Flexible link 78 is attached to a curved rod 80 which may also provide support for the hose of the MIG welding gun 40. Affixed to the top of the shaft 12 is a multi-spoked handle 82 which is used to rotate the shaft after a welding operation to release a T-junction connector from a threaded adapter 60 on the opposite end of shaft 12 (see FIG. 5).

Attached to leg 72 are a pair of horizontally diverging arms 88, provided on their free ends with spaced apart handles 90. Arms 88 are provided with canted rollers 92 for slidably supporting the framework on a horizontal main pipe. The brackets which support rollers 52 are adjustable towards or away from each other to accommodate a variety of main pipe diameters. An articulated rod 94 is attached on its one end to leg 70 and on its opposite end to the ring gear 26 (see FIG. 1) of the welding apparatus. Articulated rod 94 prevents the rotation of the ring gear 26 while permitting the rotation of frame 20 when stepper motor 42 is energized. The rod 94 is articulated by a hinge 96 which permits a limited vertical displacement of the welding apparatus. A cross-brace 98 provides stability and strength for arms 88 and handles 90. Vertical braces 100 support and strengthen the horizontal section 74 of the leg 70.

Figure 7:
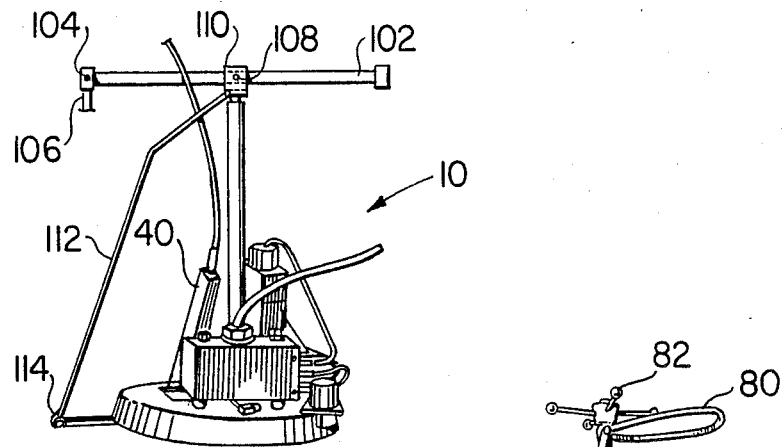
FIG. 7 illustrates an alternate support structure for the welding apparatus shown in FIG. 6.

The welding apparatus illustrated in FIG. 1 can likewise be supported by a horizontal beam 102, illustrated in FIG. 7. The beam 102 which is tiltable in a vertical plane about a horizontal pivot 104. The shaft 12 is likewise tiltable about a horizontal pivot 108, which passes though the sides of a box structure 110 and the beam 102. The horizontal pivot 108 keeps the shaft 12 in a vertical attitude regardless of the tilt of the beam 102. The beam 102 may be attached to a fixed post 106, in which case a main pipe is moved along under the welding apparatus to align preformed holes in the main pipe with a T-junction connector 50 attached to the lower end of shaft 12. Alternatively, the beam 102 may be pivoted from a pillar affixed to a wheeled trolley (not illustrated) which may be wheeled about to position the welder over a main pipe. The beam may also be pivoted from the pillar of a machine trolley (not illustrated) which rides a track that is parallel to a horizontal rack or stand for supporting a main pipe. This permits the welder to be moved along over a main pipe and lowered into welding position wherever a T-junction connector 50 is required. The beam 102 is preferably biased by a spring or pneumatic cylinder (not illustrated) which counteracts the weight of welding apparatus 10 so that the beam 102 rests in any tilt in which it is released. This is not an imperative feature but adds greatly to the convenience of using the apparatus and is much preferred.

If the welding apparatus 10 is supported from the beam 102, as described above, a stabilizer for the ring gear 26 (see FIG. 1) must be provided. This may be accomplished, for example, with an elongated arm 112 affixed on its upper end to the box structure 110 and articulated by a hinge 114 near its lower end. The horizontal lower section of the arm 112 is attached to the ring gear 26 and prevents the gear from rotating when the motor 22 is energized.

It will be appreciated by those skilled in the art that alternate stabilizers for ring gear 26 may be readily devised. It will also be appreciated by those skilled in the art that an elongated shaft 12 is not an essential part of the invention. The frame 20 may be rotatably supported from a variety of other structures provided that some means for supporting a T-junction connector 50 in a radial relationship to a main pipe during a welding operation is provided.

Motors 22, 32, and 42 are preferably stepper motors which are known in the art and widely available. Although other types of electrical motors equipped with feedback loops may also be employed for controlling the movement of the welding gun 40, stepper motors are simpler to use and therefore preferred.

The operation of stepper motors 22, 32 and 42 is controlled by a computer (not illustrated) which is connected to a control switch 84 (FIG. 6) by an electrical cable 86. Any microcomputer which is capable of writing a digital signal to an output port (an RS232 port, for example) may be employed for automating the apparatus of the invention. The particular computer model selected for the preferred embodiment of the invention is a Tandy 102*, a small lap-top micro-computer with an LCD display and 32k RAM (random access memory). The computer is connected to a "smart stepper controller" integrated circuit board. There are various stepper motor controller integrated circuits which are commercially available. The controller incorporated in the preferred embodiment of the invention is capable of directing the movement of four different stepper motors. It is currently manufactured by Alpha Product*, a company doing business in the United States. A dedicated interface, also available from Alpha Product*, interconnects the RS232 port of the computer and the stepper motor controller. The interface formats all communications between the stepper motor controller and the computer.

On start-up, the micro-computer runs a proprietary programme, a copy of which is appended hereto, which begins operation by initializing memory variables, sending a reset command to the stepper motor controller and offering the user a menu of options described below:

<ENTER>—Initiates normal welding startup wherein the user is prompted for the diameters of the main pipe and T-junction connectors to be welded. The current version of the program stores 15 commonly used junction line profiles. If a main pipe/T-junction connector combination is selected that is not among the 15 stored junction line profiles, the profile of the junction line must be computed, as will be described below.

<ESC>—Returns the welding gun to the start position without initializing and, consequently, without checking the position of the welding gun except for the Z-axis rotation.

<M>—Memorizes the position of the welding gun so that it can be returned to again when desired.

<Q>—Saves operating variables such as welding speed and weave pattern to replace the default values loaded on startup.

<S>—Changes the welding speed setting without reinitialization.

As is apparent from the above, the welder is provided with a variable welding speed setting and an adjustable welding weave pattern option which permits the apparatus to operate the welding gun 40 at its maximum efficiency.

Junction profile data is derived and stored as sixty-four numbers in thirty-two sets of two numbers each. The first number of each set represents the degrees of rotation about the Z-axis (frame 20 rotation) and the second number represents the Y-axis (vertical) position of the bracket 36 that supports the welding gun 40. The X-axis (horizontal) position is stored as a separate number and is derived using the diameter of a T-junction connector. Each profile is calculated in the following manner:

Rotation about the Z-axis is incremented in 12° steps in the current version of the programme; and The Y-axis position =INT ((sin(Z-axis degrees/57.295)×1000)×(T-junction connector diameter 2/(4×main Pie diameter))).

The apparatus welds T-junction connector joints in the following manner. An operator begins a welding operation by turning on the machine and inputting to the computer the main pipe and T-junction connector diameters to be welded. If the pipe diameters input correspond to one of the 15 stored junction line profiles, the profile is retrieved for use. Otherwise, a new junction line profile is computed using the formulas above.

The computer prepares the apparatus for welding by moving the welding gun 40 to a reference position which is attained by energizing each stepper motor until a limit switch (not illustrated) for each of motors 22, 32 and 42 is closed. Once the reference position of the welding gun 40 is attained, the computer signals the stepper motor controller to move the welding gun into welding position using the junction line profile data. It then stops the motors and powers on a ready light which is located on switch box 84 (FIG. 6). The operator attaches a T-junction connector to the end of shaft 12 (FIG. 5) and positions it in a preformed hole in a main pipe, as explained above. The operator then presses a weld cycle switch on the switch box 84 and the computer directs the apparatus through the welding sequence.

The welding sequence is programmed to proceed in a clockwise direction on one welding cycle and a counter-clockwise direction on the next. The alternation of the welding direction prevents over twisting of the welding hose and the communication cable 86. By adjusting the welding speed and welding weave (up and down motion along the Y-axis) an excellent weld may be attained. Once an acceptable weld is achieved, the operating data can be stored as described above and the welding sequence can be repeated thereafter any number of times.

It is readily apparent from the above that, once adjusted, the apparatus of the invention may be operated by a person without welding experience to repeatedly achieve acceptable welding results.

Changes and modifications in the specifically described embodiments can be carried out without departing from the scope of the invention which is intended to be limited only by the scope of the appended claims.

The embodiments of the invention in which an exclusive property or privilege is claimed are defined as follows:

1. A portable apparatus for automatically welding the junction line of a T-junction connector to a main pipe, comprising:
    a shaft supported perpendicular to said main pipe, said shaft having an adapter attachably connected to its one end for supporting one said T-junction connector in a hole preformed in said main pipe;
    an extendible leg inclined toward said shaft and provided with a wheel on its lower end;
    a vertical sleeve affixed to the free end of said extendible leg for slidably accommodating said shaft;
    means for limiting the travel of said shaft in said vertical sleeve;
    a pair of horizontal diverging arms affixed on their one ends to said leg and terminating in a pair of handles for moving said apparatus on said wheel;
    a frame perpendicular to and rotatable about said shaft above said adapter;
    a motor for rotating said frame about said shaft;
    a bracket for supporting a welding means, said bracket being attached to said frame so that it is movable along an axis parallel with and perpendicular to said shaft;
    motors for moving said bracket along each of said respective axis; and
    a computer for receiving data defining the diameter of said main pipe and said T-junction connector, calculating the points of the junction therebetween, and transmitting digital signals to a controller for said motors so as to move said welding means in the three dimensional eliptical path of said junction line to effect a welded joint between said T-junction connector and said main pipe.

2. The transportable apparatus as recited in claim 1 further including an opposing pair of rollers canted towards each other and affixed to the underside of each of said arms for movably supporting said apparatus on a main 3. Apparatus for automatically welding the junction line of a T-junction connector to a main pipe, said apparatus comprising:
    a shaft supported perpendicular to said main pipe, said shaft having an adapter detachably connected to its one end for supporting one said T-junction connector in a hole performed in said main pipe;
    a beam affixed to a pillar by a horizontal pivot so that it is tiltable in a vertical plane, and
    said shaft is connected to said beam by a second horizontal pivot so that it remains vertical when said beam is tilted on its pivot;
    a frame perpendicular to and rotatable about said shaft above said adapter;
    a motor for rotating said frame about said shaft;
    a bracket for supporting a welding means, said bracket being attached to said frame so that it is movable along axes parallel with and perpendicular to said shaft;
    motors for moving said bracket along each of said respective axis; and
    a computer for receiving data, defining the diameter of said main pipe and said T-junction connector, calculating the points of the junction therebetween, and transmitting digital signals to a controller for said motors so as to move said welding means in the three dimensional elliptical path of said junction line to effect a welded joint between said T-junction connector and said main pipe.

4. Apparatus as recited in claim 1 or 3 wherein said bracket is attached to said frame by a combination comprising:
    a first drive block attached to said frame and having a threaded bore parallel with said frame;
    a threaded rod engaged in and extending beyond each end of said bore; said rod being journalled on each of its ends to bearings connected to a first member
    a second drive block attached to said first member and having a threaded bore perpendicular with said frame;
    a second threaded rod engaged in and extending beyond each end of said bore, said rod being journalled on each of its ends to bearings connected to a second member;
    said bracket being connected to said second member; and
    the drive shafts of said motors being in respective driving engagement with said threaded rods.

5. The apparatus as recited in claim 3 wherein said pillar is mounted to a wheeled trolley.

6. A method for automatically welding a T-junction connector to a main pipe comprising:
    placing a main pipe, having at least one preformed hole for accommodating a T-junction connector, on a horizontal support with said hole facing up;
    positioning a portable welding apparatus including a supporting framework having means for movably supporting said apparatus on said main pipe and further including a rotatable frame carrying welding means above a T-junction connector supported in said hole so that said welding means rotates in a circle substantially concentric with said T-junction connector and is displaceable by means of two motors along axes parallel with and perpendicular to said T-junction connector and said frame being rotated by means of a third motor;

entering the diameters of said main pipe and said T-junction connector into a computer which retrieves form an inventory, or calculates, a firsts variably for positioning said welding means along the axis perpendicular to said T-junction connector and two variables for each of a plurality of points on the three-dimensional elliptical line of the junction of said T-junction connector and said main pipe, the first of said two variables representing an increment of rotation about said T-junction connector and the second of said two variables representing an increment of movement along the axis parallel with said T-junction connector, and transmitting said variables to a controller for said motors to move said welding means along said junction line and effect a weld thereon.

* * * * *